Jan. 19, 1943.　　　　F. J. RAYBOULD　　　　2,308,542
COUPLING
Filed Dec. 6, 1941

INVENTOR
Frank J. Raybould
By Stebbins and Blenko
attorneys

Patented Jan. 19, 1943

2,308,542

UNITED STATES PATENT OFFICE 2,308,542

COUPLING

Frank J. Raybould, Erie, Pa., assignor to Raybould Coupling Company, Meadville, Pa., a corporation of Pennsylvania Application December 6, 1941, Serial No. 421,944

12 Claims. (Cl. 287—114)

This invention relates to couplings for joining together members such as structural members or tubing. The invention further relates to couplings having wedge or similarly operated holding or gripping means and to means for preventing binding of such means upon uncoupling.

The invention is broadly applicable to couplings having holding or gripping means operated by wedge or similar action whether the gripping means be applied internally or externally of the members to be coupled. Purely for purposes of explanation and illustration the invention will be shown and described as embodied in an internal coupling. Couplings of this type are adapted for joining together sections of tubing or joining a non-tubular member to a tubular member.

It is known to provide an internal coupling having a gripping member adapted to grip the inside of a section of pipe or tubing and wedge means for operating the gripping member. The wedge means is movable axially of the coupling and may conveniently be moved by a screw. Couplings of this type are shown in my United States Patent No. 2,214,177. Such couplings have been found highly satisfactory in use but difficulty has at times been encountered in uncoupling them due to the fact that the operating means tends to wedge into the gripping means when it is attempted to withdraw such means from a tubing section, and in some cases withdrawal has not been possible. A wedge shaped operating nut has been mounted to travel upon a screw, the nut lying largely or substantially within the gripping member. When the nut has been loosened from the gripping member by turning of the screw and an attempt has been made to withdraw the assembly comprising the screw, nut and gripping member from within a tubing section the nut has moved forward relatively to the gripping member and wedged therein with the result that the gripping member has been expanded into tight gripping engagement with the interior of the tubing section and withdrawal has been impossible.

I provide for eliminating the difficulty of withdrawal of a wedge or similarly operated coupling assembly above explained. I provide for maintaining the gripping member out of wedging or binding engagement with the operating member during withdrawal. This is preferably accomplished by means connected with the screw, when a screw is employed, engaging the gripping member upon withdrawal to move the gripping member ahead of the operating member and thus prevent wedging engagement therebetween.

Other details, objects and advantages of the invention will become apparent as the following description of certain present preferred embodiments thereof proceeds.

In the accompanying drawing I have shown certain present preferred embodiments of the invention, in which Figure 1 is a view partly in elevation and partly in central longitudinal cross section through a coupling;

Figure 1:
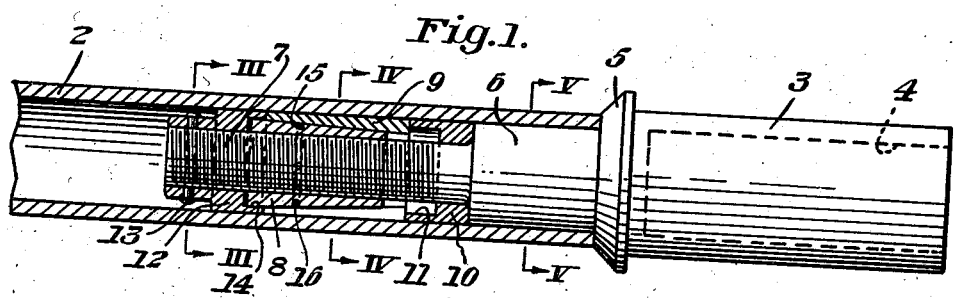

Referring first to Figures 1, 3, 4 and 5, there is shown a coupling for joining a section 2 of tubing and a non-tubular member 3. The member 3 is shown as having an axial socket 4, an integral radial flange 5 and a solid axial extension 6. Extending axially from the extension 6 and integral therewith is a screw 7. Threaded onto the screw 7 is a nut 8. Such nut has its outer surface tapered as shown.

There is provided a holding or gripping member shown as being in the form of a resilient split sleeve 9 having a substantially cylindrical outer surface and having a tapered bore to wedgingly receive the nut 8. It is not essential that both the outer surface of the nut 8 and the bore of the sleeve 9 be tapered; one only of such outer surface and bore may be tapered and the desired result can be accomplished. The sleeve 9 is of such external diameter when not expanded by wedging action of the nut 8 that it may be pushed frictionally into the tubing section 2 and withdrawn therefrom. The sleeve when not expanded makes a sufficiently tight frictional fit with the inner surface of the tubing section that it may for operative purposes be considered as non-rotative relatively to the tubing section. Alternatively, the sleeve may be maintained in non-rotative relation relatively to the tubing section otherwise than by friction, as, for example, by keying the same thereto.

As shown in Figure 1, the nut 8 lies for the most part within the sleeve 9 and the screw 7 is threaded through the nut. A spacing collar 10 is shown between the extension 6 and the sleeve 9, such collar having an enlarged axial bore 11 for receiving the right-hand end of the nut 8 viewing Figure 1 in case such end of the nut should project through the sleeve 9. Such might be the case if the tubing section 2 should be of somewhat greater internal diameter than ordinarily encountered for the size coupling employed. When the internal diameter of the tubing section is that ordinarily encountered for the size coupling employed the right-hand end of the nut 8 will not project beyond the right-hand end of the sleeve 9 viewing Figure 1 and in such case the collar 10 serves only a spacing function and might be replaced by an integral further extension of the extension 6.

Fastened to the screw 7 adjacent its left-hand end viewing Figure 1 is a collar 12. The collar is maintained in place against either rotation about or axial movement along the screw 7 by a pin 13 passing through the collar and screw. The collar has an enlarged axial bore 14 for receiving the left-hand end of the nut 8 when the nut has been moved toward the left viewing Figure 1. The length of the sleeve 9 is only slightly less than the axial distance between the right-hand face of the collar 12 and the left-hand face of the collar 10 viewing Figure 1 so that the sleeve may have freedom for rotation relatively to the collar 12 but not freedom for any substantial axial movement relatively to the assembly comprising the screw 7 and the collars 10 and 12. The sleeve 9 and the collar 10 both lie loosely about the screw 7 when the coupling is uncoupled, but the external diameter of the collar 10 is fixed, being substantially the same as that of the extension 6, while that of the sleeve 9 is subject to change due to the wedging action of the nut 8.

In operation of the coupling shown in Figure 1 the assembly comprising the member 3 with the integral extension 6 and screw 7 having thereon the collars 10 and 12, the nut 8 and the sleeve 9 is introduced into the tubing section 2 until the right-hand end of the tubing section abuts the flange 5. Prior to such introduction the nut 8 will have been turned as far as it will go toward the left viewing Figure 1 so that it does not have any wedging or expanding effect upon the sleeve 9. After the coupling assembly has been introduced into the tubing section the member 3 is turned in the clockwise direction as viewed from the right-hand end of Figure 1 relatively to the tubing section 2, which causes the nut 8 to ride toward the right viewing Figure 1 along the screw 7 into wedging engagement with the sleeve 9. As the sleeve 9 is a split sleeve it is radially resilient and turning of the member 3 as just explained results in wedging action of the nut 8 within the sleeve 9 and consequent expansion of the sleeve into holding or gripping engagement with the interior wall of the tubing section 2. Prior to expansion of the sleeve 9 it is maintained non-rotative with respect to the tubing section 2 by friction or other means as above explained. Prior to expansion of the sleeve the coupling assembly may be inserted or withdrawn at will. When, however, the sleeve 9 is expanded by the nut 8 this results in gripping engagement between the sleeve 9 and the interior wall of the tubing section 2 and binding of the coupling assembly within the tubing section. Thus the member 3 and the tubing section 2 are to all intents and purposes permanently coupled or fastened together.

When it is desired to uncouple the joint the member 3 is turned relatively to the tubing section 2 in the counterclockwise direction as viewed from the right-hand end of Figure 1. This results in movement of the nut 8 toward the left viewing Figure 1 relatively to the sleeve 9 and consequent gradual reduction of the wedging or expanding force exerted upon the sleeve by the nut. When the nut has moved to the position shown in Figure 1 when it is substantially as far to the left as it will go the wedging or expanding force exerted upon the sleeve 9 has been substantially entirely eliminated so that the sleeve is no longer in holding or gripping engagement with the interior wall of the tubing section 2 but is simply relatively lightly frictionally engaged therein. After thus loosening the coupling the member 3 and the elements assembled therewith may be withdrawn from the tubing section 2 simply by pulling the same out toward the right viewing Figure 1. Upon pulling the tubing assembly toward the right the right-hand face of the collar 12 viewing Figure 1 engages the left-hand face of the sleeve 9 so that as the assembly moves toward the right the collar 12 pushes the sleeve 9 ahead of it. This avoids the possibility that upon withdrawal of the coupling assembly the sleeve due to friction within the tubing section 2 will remain stationary until the nut 8 wedgingly engages within it. Thus easy withdrawal of the coupling assembly at all times is insured.

The outer surface of the nut 8 has formed therein a circumferential groove 15 wherein lies a resilient split ring 16 which tends to spring out into engagement with the inner tapered face of the sleeve 9. The ring 16 insures sufficient frictional engagement between the nut 8 and the sleeve 9 that when the member 3 is turned to tighten the coupling after the assembly has been introduced into the tubing section 2 the nut 8 will not simply turn with the screw 7 rather than advance axially along the screw. The split ring 16 is not essential but it insures more rapid operation of the coupling by eliminating turning of the nut 8 with the screw 7 within the sleeve 9. In operation of the coupling to tighten the sleeve 9 within the tubing section 2 the nut 8 is to all intents and purposes non-rotative relatively to the sleeve 9. This non-rotative relation may be obtained otherwise than by use of the split ring 16, as, for example, by keying the nut 8 and sleeve 9 together so as to allow for relative axial movement therebetween but prohibit relative rotational movement.

Figure 2:
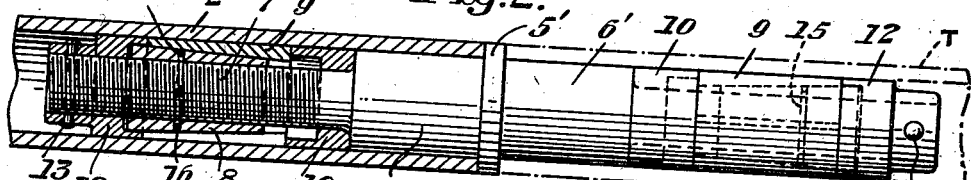
Figure 2 is a view similar to Figure 1 through a modified form of coupling.
Figure 3:
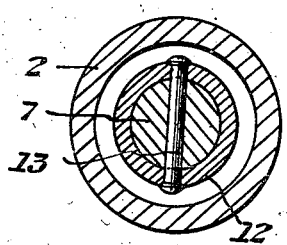
Figure 3 is a transverse cross-sectional view to enlarged scale taken on the line III—III of Figure 1.
Figure 4:
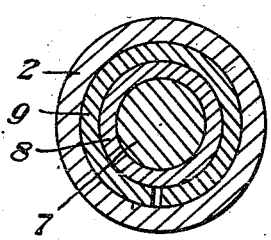
Figure 4 is a transverse cross-sectional view to enlarged scale taken on the line IV—IV of Figure 1.
Figure 5:
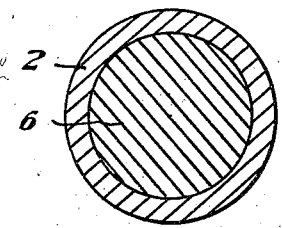
Figure 5 is a transverse cross-sectional view to enlarged scale taken on the line V—V of Figure 1.

Figure 2 shows a form of coupling similar to that of Figure 1 but with the coupling assembly of Figure 1 duplicated to provide for coupling together two tubing sections. Parts in Figure 2 which are identical with parts in Figure 1 are marked with the same reference numerals. The extension 6 of Figure 2 is integral with a flange 5' whose external diameter is substantially the same as the external diameter of the tubing sections being coupled. In place of the member 3 of Figure 1 there is provided in Figure 2 an extension 6' integral with the assembly consisting of the screw 7, the extension 6 and the flange 5', and carried by the extension 6' is a coupling assembly shown at the right-hand end of Figure 2 which is identical with the coupling assembly shown at the left-hand end of that figure and at the left-hand end of Figure 1. The double coupling of Figure 2 is operated by telescoping a tubing section over each of the coupling assemblies and then relatively turning such tubing sections. Each of the tubing sections is thus coupled to the double coupling and each tubing section abuts the flange 5'. The right-hand tubing section in Figure 2 is designated by the chain lines T.

Figure 6:
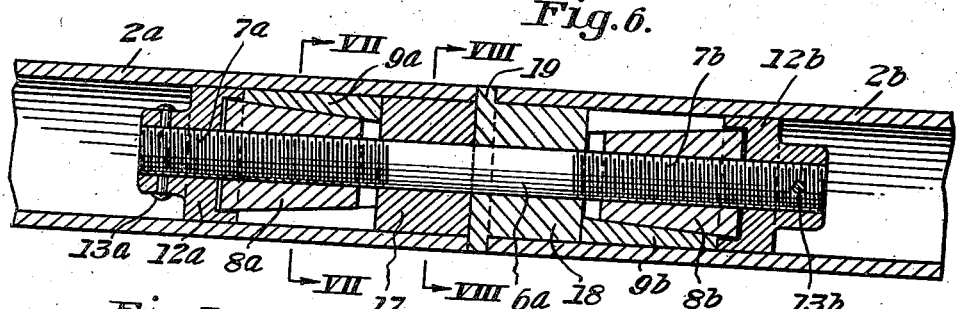
Figure 6 is a central longitudinal cross-sectional view through another form of coupling.
Figure 7:
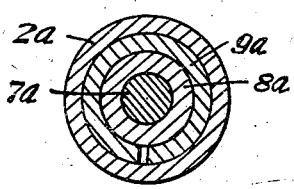
Figure 7 is a transverse cross-sectional view taken on the line VII—VII of Figure 6.
Figure 8:
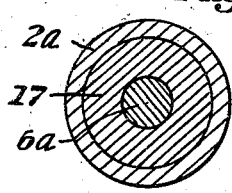
Figure 8 is a transverse cross-sectional view taken on the line VIII—VIII of Figure 6.

Another form of double coupling is shown in Figures 6, 7 and 8. Two tubing sections 2a and 2b are shown as being coupled together. There is provided a stud 6a threaded at each end to form opposed integral screws 7a and 7b. There are provided nuts 8a and 8b, sleeves 9a and 9b, collars 12a and 12b and pins 13a and 13b analogous to the nut 8, sleeve 9, collar 12 and pin 13 of Figure 1. Surrounding the stud 6a between the sleeves 9a and 9b are spacers 17 and 18, the latter having a radial flange 19 whose external diameter is substantially the same as the external diameter of the tubing sections 2a and 2b. The tubing sections 2a and 2b are introduced over the respective coupling assemblies in the same manner as above described in connection with the double coupling of Figure 2 and are turned to bring the coupling assemblies into gripping engagement with the tubing sections. The collars 12a and 12b operate to prevent binding or wedging engagement between the nuts and sleeves upon uncoupling in the same manner as above described with respect to the structure shown in Figure 1.

While I have shown and described certain present preferred embodiments of the invention it is to be distinctly understood that the invention is not limited thereto but may be otherwise variously embodied within the scope of the following claims.

I claim:

1. A coupling comprising expansible and contractible holding means positionable non-rotatably with respect to one of two members to be joined and adapted in one of expanded and contracted conditions to assume holding engagement with respect thereto, means travelable axially of the coupling for operating said holding means, said travelable means being in frictional engagement with said holding means, control means operatively connected with the travelable means and the other of said members and operable upon relative turning of said control means and said travelable means for causing axial travel of said travelable means and means limiting axial displacement of said holding means relatively to said control means to prevent operation of said holding means by said travelable means when said holding means is out of holding engagement with respect to said first mentioned member and said first mentioned member and control means are drawn apart.

2. A coupling comprising expansible and contractible holding means positionable non-rotatably with respect to one of two members to be joined and adapted in one of expanded and contracted conditions to assume holding engagement with respect thereto, means travelable axially of the coupling for operating said holding means, said travelable means being in frictional engagement with said holding means, control means operatively connected with the other of said members and operable upon relative turning of said control means and said travelable means for causing axial travel of said travelable means, the frictional engagement between said holding means and said travelable means preventing substantial relative rotation therebetween when said control means is turned relatively to said first mentioned member in such direction as to cause said travelable means to operate said holding means whereby said travelable means will partake of axial traveling movement rather than rotative movement relatively to said holding means, and means limiting axial displacement of said holding means relatively to said control means to prevent operation of said holding means by said travelable means when said holding means is out of holding engagement with respect to said first mentioned member and said first mentioned member and control means are drawn apart.

3. A coupling comprising expansible and contractible holding means positionable non-rotatably with respect to one of two members to be joined and adapted in one of expanded and contracted conditions to assume holding engagement with respect thereto, means travelable axially of the coupling for operating said holding means, control means operatively connected with the other of said members and operable upon relative turning of said control means and said travelable means for causing axial travel of said travelable means, means preventing substantial relative rotation between said holding means and said travelable means when said control means is turned relatively to said first mentioned member in such direction as to cause said travelable means to operate said holding means whereby said travelable means will partake of axial traveling movement rather than rotative movement relatively to said holding means, and means limiting axial displacement of said holding means relatively to said control means to prevent operation of said holding means by said travelable means when said holding means is out of holding engagement with respect to said first mentioned member and said first mentioned member and control means are drawn apart.

4. A coupling comprising means for frictionally engaging one of two members to be joined, wedge means for operating said engaging means, control means operatively connected with the other of said members for controlling operation of said wedge means and means acting when said wedge means is inoperative with respect to said engaging means and upon drawing apart of said first mentioned member and said control means to maintain said wedge means inoperative with respect to said engaging means whereby to prevent binding of the parts.

5. A coupling comprising means for engaging one of two members to be joined, control means including wedge means and a portion operatively connected with the other of said members for causing said engaging means to assume holding engagement with respect to said first mentioned member and means acting when said wedge means is inoperative with respect to said engaging means and upon drawing apart of said first mentioned member and said control means to maintain said wedge means inoperative with respect to said engaging means whereby to prevent binding of the parts.

6. In a coupling, gripping means for gripping a member to be joined to another member, wedge means for operating the gripping means and means for withdrawing the gripping means from engagement with the first mentioned member and for simultaneously moving the wedge means with said gripping means, said last mentioned means including a portion maintaining the wedge means inoperative with respect to the gripping means during withdrawal to prevent binding.

7. In a coupling, gripping means for entering a hollow member and gripping the same internally, wedge means for operating the gripping means and means for withdrawing the gripping means and wedge means from the hollow member and including means maintaining the wedge means inoperative with respect to the gripping means during withdrawal to prevent binding.

8. In a coupling, gripping means for entering a hollow member and gripping the same internally, wedge means for operating the gripping means, rotatable means for operating the wedge means and for withdrawing the gripping means and wedge means from the hollow member and means connected with said rotatable means maintaining the wedge means inoperative with respect to the gripping means during withdrawal to prevent binding.

9. In a coupling, gripping means for gripping a member, wedge means for operating the gripping means, means for operating the wedge means and for withdrawing the gripping means from engagement with said member and at the same time moving the wedge means with said gripping means, and means connected with said wedge operating means maintaining the wedge means inoperative with respect to the gripping means during withdrawal to prevent binding.

10. In a coupling, gripping means for gripping a member, wedge means for operating the gripping means, screw means for operating the wedge means and for withdrawing the gripping means from engagement with said member and means connected with the screw means and adapted to engage the gripping means to maintain the same out of wedging engagement with the wedge means during withdrawal to prevent binding.

11. In a coupling, gripping means for entering a hollow member and gripping the same internally, means for operating the gripping means adapted to have wedging engagement therewith, a screw threaded into said operating means for moving the same into and out of wedging engagement with the gripping means and for withdrawing the gripping means and operating means from the hollow member and means connected with the screw maintaining the operating means out of wedging engagement with the gripping means during withdrawal to prevent binding.

12. In a coupling, gripping means for entering a hollow member and gripping the same internally, a nut for operating the gripping means adapted to have wedging engagement therewith, a screw threaded into said nut for moving the nut into and out of wedging engagement with the gripping means and for withdrawing the gripping means and nut from the hollow member and means connected with the screw and adapted to engage the gripping means to maintain the same out of wedging engagement with the nut during withdrawal to prevent binding.

FRANK J. RAYBOULD.